(12) United States Patent
Brück et al.

(10) Patent No.: US 6,316,384 B1
(45) Date of Patent: Nov. 13, 2001

(54) HONEYCOMB BODY CONFIGURATION WITH SUPPORT SECTIONS

(75) Inventors: Rolf Brück; Wolfgang Maus, both of Bergisch Gladbach (DE)

(73) Assignee: Emitec Gesellschaft für Emissions Technologie mbH, Lohmar (DE)

( * ) Notice: Subject to any disclaimer, the term of this patent is extended or adjusted under 35 U.S.C. 154(b) by 0 days.

(21) Appl. No.: 09/539,244

(22) Filed: Mar. 30, 2000

Related U.S. Application Data

(63) Continuation of application No. PCT/EP98/06171, filed on Sep. 29, 1998.

(30) Foreign Application Priority Data

| Sep. 30, 1997 | (DE) | 197 43 196 |
| Jan. 2, 1998 | (DE) | 298 00 038 |

(51) Int. Cl.⁷ ............. B01J 32/00; B01J 35/04; B32B 3/12
(52) U.S. Cl. ............. 502/439; 502/527.19; 428/116
(58) Field of Search ............. 502/439, 527.19; 428/116

(56) References Cited

U.S. PATENT DOCUMENTS

| 3,853,485 | 12/1974 | Hogan . |
| 4,985,212 | 1/1991 | Kawakami et al. . |
| 5,098,763 | 3/1992 | Horikawa et al. . |
| 5,486,338 | * 1/1996 | Ota et al. . |

FOREIGN PATENT DOCUMENTS

| 74 01 002 | 4/1974 | (DE) . |
| 40 01 419 C1 | 6/1991 | (DE) . |
| 195 08 681 A1 | 9/1995 | (DE) . |
| 0 241 269 | 10/1987 | (EP) . |
| 11-512801 | * 11/1999 | (JP) . |

OTHER PUBLICATIONS

Published International Application No. WO 94/15712 (Maus), dated Jul. 21, 1994, as mentioned on p. 2 of the specification.
Japanese Patent Abstract No. 0120716 (Koichi), dated Sep. 26, 1989.

* cited by examiner

*Primary Examiner*—Steven P. Griffin
*Assistant Examiner*—Christina Ildebrando
(74) *Attorney, Agent, or Firm*—Herbert L. Lerner; Laurence A. Greenberg; Werner H. Stemer

(57) ABSTRACT

A honeycomb body configuration includes a metal housing accommodating a honeycomb body having a plurality of channels separated from one another by dividing walls. The honeycomb body has varying radial strength along its periphery. A compensation layer is disposed at least in partial regions of the periphery between the housing and the honeycomb body. The compensation layer has at least two support sections in the peripheral direction of the honeycomb body which exert greater forces in the radial direction upon the honeycomb body than outside the support sections in remaining peripheral regions. The support sections are disposed in regions where the honeycomb body has greater radial strength. Steps can be taken to produce the support sections on the compensation layer, by using support segments on the housing and/or beads on the honeycomb body, in each case in the peripheral regions of greater strength. The invention is particularly suitable for simple and sound installation of thin-walled extruded ceramic honeycomb bodies in metal housings.

90 Claims, 2 Drawing Sheets

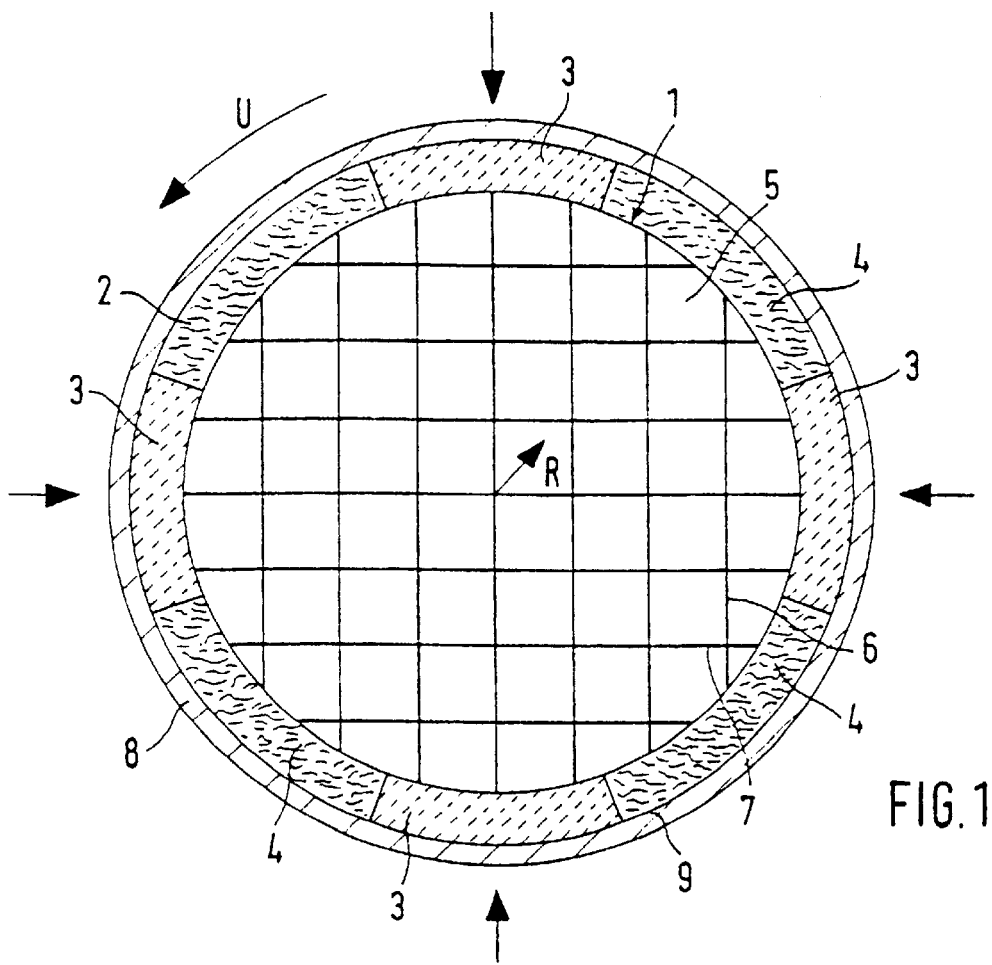
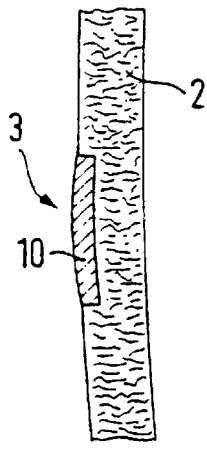
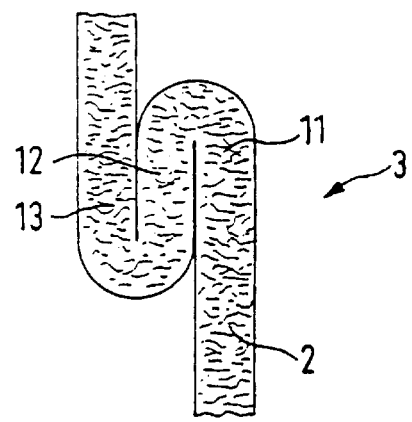
FIG.1
FIG.2
FIG.3

HONEYCOMB BODY CONFIGURATION WITH SUPPORT SECTIONS

CROSS-REFERENCE TO RELATED APPLICATION

This application is a continuation of copending International Application No. PCT/EP98/06171, filed Sep. 29, 1998, which designated the United States.

BACKGROUND OF THE INVENTION

Field of the Invention

The present invention relates to a honeycomb body configuration, in particular for catalyst-carrier bodies for purifying exhaust gases of motor vehicles.

German Utility Model G 74 01 002, for example, discloses a honeycomb body configuration having a housing, a honeycomb body disposed in the housing and having varying radial strength along its periphery, and a compensation layer disposed between the housing and the honeycomb body.

Honeycomb bodies of that kind have a plurality of channels separated from one another by dividing walls. The channels have square, rectangular or other polygonal cross-sections. U.S. Pat. No. 3,853,485 describes various cross-sectional shapes.

Due to the geometrical configuration of the channels and the configuration of the channels inside a cross-sectional surface area of the honeycomb body, a honeycomb body of that kind has varying strengths distributed peripherally in the radial direction. Those varying strengths of the honeycomb body also affect the breaking behavior and elastic behavior of the honeycomb body. International Publication No. WO 94/15712 discloses a honeycomb body having increased elasticity, wherein, in particular, the elasticity properties do not differ in different directions. According to the proposal in International Publication No. WO 94/15712, the honeycomb body has dividing walls at least in one outer region. The dividing walls are disposed and shaped in such a way that in cross-section through the honeycomb body structures which are rigid in the radial direction and/or rigid supporting structures extending in the peripheral direction are not formed by them.

A honeycomb body of that kind which is produced from a ceramic and/or metal material is advantageous in that it is not easily destroyed by forces acting through a housing in the radial direction upon the honeycomb body. That is because the honeycomb body has uniform strength radially over its periphery.

The theoretical problem of a honeycomb body being destroyed by forces which the housing exerts uniformly in the radial direction upon the honeycomb body is solved by International Publication No. WO 94/15712.

SUMMARY OF THE INVENTION

It is accordingly an object of the invention to provide a honeycomb body configuration with support sections, which overcomes the hereinafore-mentioned disadvantages of the heretofore-known devices of this general type and in which damage, even to a catalyst carrier body with different properties of radial strength over its periphery, by forces directed radially by the housing, can be avoided.

With the foregoing and other objects in view there is provided, in accordance with the invention, a honeycomb body configuration, comprising a metal housing; a honeycomb body disposed in the metal housing, the honeycomb body having a radial direction, a periphery defining a peripheral direction, varying radial strength along the periphery defining regions of greater radial strength, and dividing walls defining and separating a multiplicity of channels from one another; and a compensation layer disposed at least in partial regions of the periphery between the housing and the honeycomb body, the compensation layer having at least two support sections in the peripheral direction of the honeycomb body and having remaining peripheral regions outside the at least two support sections, the at least two support sections disposed in the regions of greater radial strength, the at least two support sections exerting greater forces in radial direction upon the honeycomb body than in the remaining peripheral regions, and the at least two support sections formed at least partly by at least one insert formed of a metal material.

The invention is based on the concept that the radial properties of strength of a honeycomb body which vary along the periphery can be utilized to promote a stable hold in the housing if a compensation layer of appropriate construction is disposed between the honeycomb body and a housing. The compensation layer which is disposed between the housing and the honeycomb body has at least two support sections in the peripheral direction of the honeycomb body. These support sections exert greater forces in the radial direction upon the honeycomb body than onto the honeycomb body outside the support sections in the remainder of the peripheral regions. The support sections of the compensation layer are formed therein in regions where the honeycomb body has greater radial strength. The forces which are exerted by the housing onto the honeycomb body are received essentially in the regions of the support sections and are introduced into the relatively rigid structure of the honeycomb body. In the remainder of the peripheral regions which are disposed between each two adjacent support sections of the compensation layer, only small forces, or no forces at all, are introduced into the honeycomb body. By virtue of the compensation layer inside the housing, the honeycomb body is supported virtually in at least two places, or in two regions, as seen in section.

This embodiment of the honeycomb body configuration according to the invention ensures that the honeycomb body does not become destroyed when the honeycomb body configuration is being produced, i.e. during installation inside a housing. Another advantage of this construction is that during operation of the honeycomb body configuration the forces occurring as a result of heat expansion are received principally by the support sections, that is to say in the most stable directions of the honeycomb body.

The honeycomb body can be a metal and/or ceramic body. The channel cross-sections can have a relatively simple geometry, resulting in the formation of direction-dependent radial strengths of the honeycomb body. Typically, the invention is especially suitable for particularly thin-walled, extruded ceramic honeycomb bodies, in particular with channels of square cross-section, wherein support in four support sections is preferred, each of which exerts forces upon the honeycomb body in the direction of the channel walls.

The varying strength of the honeycomb body can be compensated for by suitably selecting the properties of the compensation layer itself. A preferred embodiment of the compensation layer is such that the support sections have a greater weight per unit of area than the other sections of the compensation layer. In particular, the support sections have a greater density than the other sections. By virtue of this embodiment of the compensation layer, a different behavior with respect to deformation is obtained between the support sections and the remainder of the peripheral regions. Greater strength of the support sections can also be obtained if the support sections are formed at least partly by at least one insert.

The insert can have a sandwich-like structure, for example, which means that the forces directed radially towards the honeycomb body by the housing are received by the insert.

Alternatively, or additionally, the insert can be formed of a material which has greater strength than a material of the other sections of the compensation layer. The use of a metal material therein is preferred.

In accordance with another feature of the invention, the insert can also serve as a contact location for an electrical terminal if the honeycomb body is intended to be an electrically heatable honeycomb body.

Preferably, the compensation layer which is disposed between the honeycomb body and the housing is at least partly in the form of a matting, which also results in the honeycomb body being thermally insulated from the housing. The compensation layer preferably contains at least one matting composed of ceramic fibers, wherein so-called "swelling mattings" are preferably used. As a result of their crystalline structure, such swelling mattings are capable of filling up cavities by swelling as a result of water absorption.

It is also possible to compensate for the different strengths radially along the periphery of the honeycomb body if the support sections are formed by at least two, preferably three, tiers in the compensation layer. The compensation layer is constructed therein in one piece, and the tiers are formed by folding up the compensation layer on itself. This possibility provides a simple and cost-effective realization of the invention.

With the objects of the invention in view, there is also provided a honeycomb body configuration, comprising a honeycomb body having a periphery defining a peripheral direction, varying radial strength along the periphery, and dividing walls defining and separating a multiplicity of channels from one another; a metal housing outside the honeycomb body, the housing having at least two support segments in the peripheral direction, the at least two support segments directed radially inwardly to form support sections; and a compensation layer disposed at least in partial regions of the periphery between the housing and the honeycomb body.

Therefore, according to this concept of the invention, the different radial properties of strength of the honeycomb body along the periphery are compensated for by a suitable construction of the housing. The radially inwardly directed support segments are formed in the regions of greater radial strength of the honeycomb body. In the regions of the support segments, the forces which are applied by the housing onto the honeycomb body are introduced into the regions of the honeycomb body where the honeycomb body has greater radial strength. This ensures that the regions of the honeycomb body of reduced radial strength only have to receive small forces or no forces at all. With this embodiment too, between the housing and the honeycomb body there is preferably a compensation layer composed of fiber matting which is more heavily compressed at the support segments than in the remainder of the peripheral regions, so that the support sections are, in turn, formed at the support segments.

The support sections can extend over the entire axial length of the honeycomb body. However, this is not absolutely necessary. Particularly for axially elongate honeycomb bodies and for honeycomb bodies which are produced in such a way that they are not exactly straight, it can be advantageous if the support sections extend over only part of the axial length of the honeycomb body, e.g. only in the vicinity of the end surfaces. Support sections can also be provided which are distributed on the lateral surface of the honeycomb body. However, the support sections should be of such size and number that the honeycomb body is held firmly and soundly in the housing.

In accordance with a further feature of the invention, the honeycomb body configuration has an even number of support sections as seen in cross-section of the honeycomb body configuration, and the support sections are disposed in such a way that two support sections are always disposed diametrically opposite one another. In each case, the support sections should be distributed uniformly over the periphery of the honeycomb body.

In accordance with an added feature of the invention, in order to simplify assembly of the honeycomb body configuration, and in order to ensure that the support sections of the compensation layer are disposed in the regions where the honeycomb body has greater radial strength, the honeycomb body and/or the compensation layer and/or the housing has/have a positioning aid. In accordance with an additional feature of the invention, the positioning aid is at least one optical marking, which also allows assembly of a honeycomb body configuration to be automated. In accordance with yet another feature of the invention, the positioning aid is formed by a projection or a recess which can then also be mechanically scanned.

With the objects of the invention in view, there is additionally provided a honeycomb body configuration, comprising a metal housing; a honeycomb body disposed in the metal housing, the honeycomb body having a periphery, varying radial strength along the periphery defining regions of greater radial strength, and dividing walls defining and separating a multiplicity of channels from one another; and a compensation layer disposed at least in partial regions of the periphery between the housing and the honeycomb body; the honeycomb body having a side facing the compensation layer and at least two radially outwardly directed bulges for forming support sections at the side in the regions of greater radial strength.

The use of this embodiment also means that the regions of the honeycomb body which have reduced radial strength only have to receive very small forces or no forces at all.

In accordance with a concomitant feature of the invention, the respective convexities or bulges are in the form of axially extending flat beads, since this gives rise to optimum passage of forces in the honeycomb body. In the compensation layer, the convexities or bulges produce support sections, and, with housings having a circular cross-section and with honeycomb bodies having a circular cross-section except for the convexities or bulges, the convexities or bulges allow the honeycomb body to be fitted according to any orientation, and the support sections are then always formed in the regions of greater radial strength. Axially extending beads can be produced during the extrusion of the honeycomb bodies if small modifications are made to the extrusion cross-section, without any particular expenditure being necessitated.

Other features which are considered as characteristic for the invention are set forth in the appended claims.

Although the invention is illustrated and described herein as embodied in a honeycomb body configuration with support sections, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, cross-sectional view of a first embodiment of a honeycomb body configuration;

FIG. 2 is a fragmentary, cross-sectional view of a first embodiment of a support section of a compensation layer;

FIG. 3 is a fragmentary, cross-sectional view of a second embodiment of a support section of a compensation layer;

DESCRIPTION OF THE PREFERRED EMBODIMENTS

Figure 4:
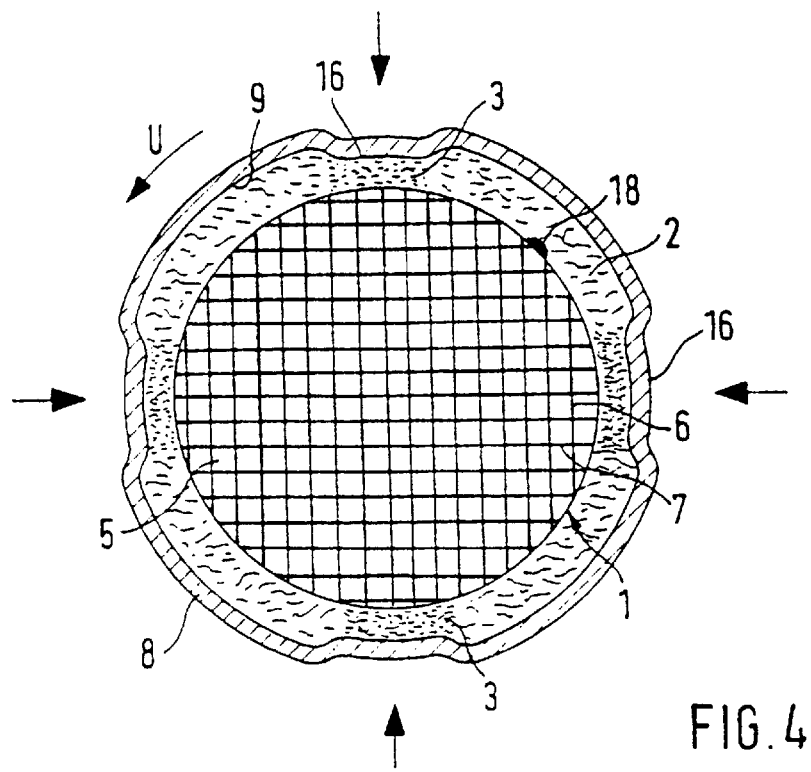
FIG. 4 is a cross-sectional view of a second embodiment of a honeycomb body configuration.

Referring now to the figures of the drawings in detail and first, particularly, to FIG. 1 thereof, there is seen a sectional view of a honeycomb body configuration according to the invention. The honeycomb body configuration has a honeycomb body 1 with a plurality of channels 5 in a housing 8. The channels 5 extend in the axial direction of the honeycomb body 1. Each channel 5 is delimited by dividing walls 6, 7. In the embodiment shown, the dividing walls 6, 7 extend in planes which are parallel or perpendicular to one another. Therefore, the honeycomb body 1 has varying rigidity in radial direction R along its periphery U. Arrows are used to characterize directions in which the honeycomb body 1 has maximum radial strength.

The honeycomb body 1 is enclosed by a compensation layer 2. The compensation layer 2, which is in the form of a ceramic fiber matting in the embodiment shown, is disposed on an inner wall surface 9 of the housing 8.

The compensation layer 2 has support sections 3 which have greater strength in the radial direction R than remaining sections 4 of the compensation layer 2. The support sections 3 are disposed in regions where the honeycomb body 1 has greater radial strength. In the embodiment shown, each two support sections 3 are disposed diametrically opposite to each other. The configuration of the support sections 3 is dependent upon the distribution of strength in the honeycomb body 1. It is therefore advantageous to provide six support sections 3 along the periphery U of the honeycomb body configuration, particularly in cases where the channels or channel configurations have a non-illustrated hexagonal cross-section. Each of the support sections 3 is spaced apart by 60° from the next in the peripheral direction U, in the places where the honeycomb body 1 has the maximum radial strength.

The forces which are directed radially inwardly by the housing 8 are introduced into the honeycomb body 1 substantially across the support sections 3 of the compensation layer 2. The support sections 3 extend at least partly in the axial direction of the honeycomb body 1. The support sections 3 preferably extend over the entire axial length of the honeycomb body 1.

FIG. 2 diagrammatically shows an embodiment of a support section 3 of a compensation layer 2. The support section is formed by an insert 10. The insert 10 is formed of a metal material.

FIG. 3 shows another embodiment of a support section 3 of a compensation layer 2, which is formed by three tiers 11, 12, 13 in the compensation layer 2 that are folded onto one another.

FIG. 4 shows a cross-sectional view of a second embodiment of a honeycomb body configuration. In this embodiment, the housing 8 has radially inwardly directed support segments 16 in the peripheral direction U of the honeycomb body 1. The support segments 16 are formed in regions of increased radial strength of the honeycomb body 1. The forces which are directed radially inwardly by the housing 8 are introduced essentially across the support segments 16 and the support sections 3 thereby occurring in the compensation layer 2, into regions where the honeycomb body 1 has greater radial strength. This avoids damage to the honeycomb body 1 when it is being fitted into the housing 8 and during subsequent operation.

With the embodiments according to FIGS. 1 and 4, it is necessary for a honeycomb body 1 to be fitted into a housing 8 with correct relative positioning. There are many possible ways of ensuring this, even with automated mass production. One particularly advantageous way resides in the honeycomb body 1 being provided with an optically and/or mechanically scannable positioning aid 18. However, this is redundant with honeycomb bodies 1 and housings 8 having non-circular cross-sections for which the present invention is also suitable, since their relative positioning is established by the cross-sectional shape, e.g. oval or elliptical.

Figure 5:
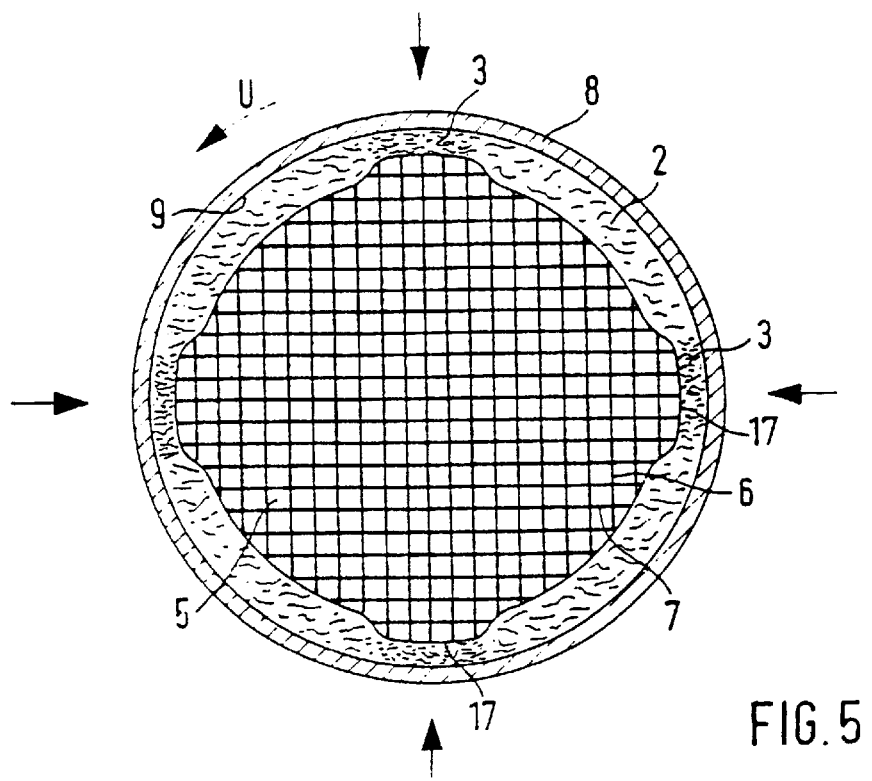
FIG. 5 is a cross-sectional view of a third embodiment of a honeycomb body configuration.

FIG. 5 shows another sectional view of an embodiment of a catalytic converter configuration according to the invention. In this embodiment, the honeycomb body 1 has radially outwardly oriented convexities or bulges 17, in the peripheral regions of its maximum radial strength, which produce support sections 3 in the compensation layer 2. The convexities or bulges 17 preferably form flat beads which extend axially over the entire length of the honeycomb body 1, so that production by extrusion is possible. The effect of the beads on the compensation layer 2 is the same as that of the support segments 16 of FIG. 4. However, the convexities or bulges 17 are always disposed in the correct position on the honeycomb body 1, whereas the support segments 16 first have to be disposed in the correct position relative to the honeycomb body 1.

Clearly, it is possible to produce support sections 3 in the compensation layer 2 by taking simultaneous measures on the compensation layer 2 and/or the housing 8 and/or the honeycomb body 1. Thus, in particular, steps may be taken to produce support sections 3 alternatingly on the housing 8, the honeycomb body 1 and/or the compensation layer 2.

The present invention is particularly suitable for the mass production of honeycomb body configurations, as required in automobile construction for the purification of exhaust gases. In particular, thin-walled ceramic honeycomb bodies can be fitted into metal housings simply and soundly according to the invention. When honeycomb body configurations of this kind are used as catalytic converters, according to the present invention the thermal alternating load capacity of the configurations is increased, which facilitates installation close to the engine. However, the invention is also suitable for honeycomb bodies which are used as carriers of other exhaust gas purification measures, such as hydrocarbon emissions, NOx-reservoirs, water emissions, etc.

We claim:

1. A honeycomb body configuration, comprising:
   a honeycomb body disposed in said metal housing, said honeycomb body having a radial direction, a periphery defining a peripheral direction, varying radial strength along said periphery defining regions of greater radial strength, and dividing walls defining and separating a multiplicity of channels from one another; and
   a compensation layer disposed at least in partial regions of said periphery between said housing and said honeycomb body, said compensation layer having at least two support sections in said peripheral direction of said honeycomb body and having remaining peripheral regions outside said at least two support sections, said at least two support sections disposed in said regions of greater radial strength, said at least two support sections exerting greater forces in radial direction upon said honeycomb body than in said remaining peripheral regions, and said at least two support sections constituted at least partly by at least one insert formed of a metal material.

2. The honeycomb body configuration according to claim 1, wherein said honeycomb body is an electrically heatable honeycomb body, and said at least one insert is formed as a contact location for an electrical terminal.

3. The honeycomb body configuration according to claim 1, wherein said honeycomb body is a ceramic honeycomb body with smooth dividing walls having a radial strength being greater in direction of said dividing walls than in other directions.

4. The honeycomb body configuration according to claim 1, wherein said honeycomb body is an extruded ceramic honeycomb body with smooth dividing walls having a radial strength being greater in direction of said dividing walls than in other directions.

5. The honeycomb body configuration according to claim 1, wherein said support sections are an even number of support sections occurring in pairs and the support sections of each pair are disposed diametrically opposite to each other in a cross-section.

6. The honeycomb body configuration according to claim 1, wherein said honeycomb body has at least one positioning aid for correct relative positioning of said honeycomb body and said housing.

7. The honeycomb body configuration according to claim 6, wherein said at least one positioning aid is optical markings.

8. The honeycomb body configuration according to claim 6, wherein said at least one positioning aid is at least one projection.

9. The honeycomb body configuration according to claim 6, wherein said at least one positioning aid is at least one recess.

10. The honeycomb body configuration according to claim 1, wherein said honeycomb body has an axial length, and said support sections extend at least over part of said axial length.

11. The honeycomb body configuration according to claim 1, wherein said honeycomb body has at least one positioning aid for correct relative positioning of said honeycomb body and said compensation layer.

12. The honeycomb body configuration according to claim 11, wherein said at least one positioning aid is optical markings.

13. The honeycomb body configuration according to claim 11, wherein said at least one positioning aid is at least one projection.

14. The honeycomb body configuration according to claim 11, wherein said at least one positioning aid is at least one recess.

15. The honeycomb body configuration according to claim 1, wherein said compensation layer has at least one positioning aid for correct relative positioning of said honeycomb body and said housing.

16. The honeycomb body configuration according to claim 15, wherein said at least one positioning aid is optical markings.

17. The honeycomb body configuration according to claim 13, wherein said at least one positioning aid is at least one projection.

18. The honeycomb body configuration according to claim 15, wherein said at least one positioning aid is at least one recess.

19. The honeycomb body configuration according to claim 1, wherein said compensation layer has at least one positioning aid for correct relative positioning of said honeycomb body and said compensation layer.

20. The honeycomb body configuration according to claim 19, wherein said at least one positioning aid is optical markings.

21. The honeycomb body configuration according to claim 19, wherein said at least one positioning aid is at least one projection.

22. The honeycomb body configuration according to claim 19, wherein said at least one positioning aid is at least one recess.

23. The honeycomb body configuration according to claim 1, wherein said housing has at least one positioning aid for correct relative positioning of said honeycomb body and said housing.

24. The honeycomb body configuration according to claim 23, wherein said at least one positioning aid is optical markings.

25. The honeycomb body configuration according to claim 23, wherein said at least one positioning aid is at least one projection.

26. The honeycomb body configuration according to claim 23, wherein said at least one positioning aid is at least one recess.

27. The honeycomb body configuration according to claim 1, wherein said housing has at least one positioning aid for correct relative positioning of said honeycomb body and said compensation layer.

28. The honeycomb body configuration according to claim 27, wherein said at least one positioning aid is optical markings.

29. The honeycomb body configuration according to claim 27, wherein said at least one positioning aid is at least one projection.

30. The honeycomb body configuration according to claim 27, wherein said at least one positioning aid is at least one recess.

31. A honeycomb body configuration, comprising:
   a honeycomb body having a periphery defining a peripheral direction, varying radial strength along said periphery, and dividing walls defining and separating a multiplicity of channels from one another;
   a metal housing outside said honeycomb body, said housing having at least two support segments in said peripheral direction, said at least two support segments directed radially inwardly to form support sections; and
   a compensation layer disposed at least in partial regions of said periphery between said housing and said honeycomb body.

32. The honeycomb body configuration according to claim 31, wherein said honeycomb body is a ceramic honeycomb body with smooth dividing walls having a radial strength being greater in direction of said dividing walls than in other directions.

33. The honeycomb body configuration according to claim 31, wherein said honeycomb body is an extruded ceramic honeycomb body with smooth dividing walls having a radial strength being greater in direction of said dividing walls than in other directions.

34. The honeycomb body configuration according to claim 31, wherein said support sections are an even number of support sections occurring in pairs and the support sections of each pair are disposed diametrically opposite to each other in a cross-section.

35. The honeycomb body configuration according to claim 31, wherein said honeycomb body, said compensation layer and said housing has at least one positioning aid for correct relative positioning of said honeycomb body and said housing.

36. The honeycomb body configuration according to claim 35, wherein said at least one positioning aid is optical markings.

37. The honeycomb body configuration according to claim 35, wherein said at least one positioning aid is at least one projection.

38. The honeycomb body configuration according to claim 35, wherein said at least one positioning aid is at least one recess.

39. The honeycomb body configuration according to claim 31, wherein said honeycomb body has an axial length, and said support sections extend at least over part of said axial length.

40. The honeycomb body configuration according to claim 31, wherein said honeycomb body has at least one positioning aid for correct relative positioning of said honeycomb body and said compensation layer.

41. The honeycomb body configuration according to claim 40, wherein said at least one positioning aid is optical markings.

42. The honeycomb body configuration according to claim 40, wherein said at least one positioning aid is at least one projection.

43. The honeycomb body configuration according to claim 40, wherein said at least one positioning aid is at least one recess.

44. The honeycomb body configuration according to claim 31, wherein said compensation layer has at least one positioning aid for correct relative positioning of said honeycomb body and said housing.

45. The honeycomb body configuration according to claim 44, wherein said at least one positioning aid is optical markings.

46. The honeycomb body configuration according to claim 44, wherein said at least one positioning aid is at least one projection.

47. The honeycomb body configuration according to claim 44, wherein said at least one positioning aid is at least one recess.

48. The honeycomb body configuration according to claim 31, wherein said compensation layer has at least one positioning aid for correct relative positioning of said honeycomb body and said compensation layer.

49. The honeycomb body configuration according to claim 48, wherein said at least one positioning aid is optical markings.

50. The honeycomb body configuration according to claim 48, wherein said at least one positioning aid is at least one projection.

51. The honeycomb body configuration according to claim 48, wherein said at least one positioning aid is at least one recess.

52. The honeycomb body configuration according to claim 31, wherein said housing has at least one positioning aid for correct relative positioning of said honeycomb body and said housing.

53. The honeycomb body configuration according to claim 52, wherein said at least one positioning aid is optical markings.

54. The honeycomb body configuration according to claim 52, wherein said at least one positioning aid is at least one projection.

55. The honeycomb body configuration according to claim 52, wherein said at least one positioning aid is at least one recess.

56. The honeycomb body configuration according to claim 31, wherein said housing has at least one positioning aid for correct relative positioning of said honeycomb body and said compensation layer.

57. The honeycomb body configuration according to claim 56, wherein said at least one positioning aid is optical markings.

58. The honeycomb body configuration according to claim 56, wherein said at least one positioning aid is at least one projection.

59. The honeycomb body configuration according to claim 56, wherein said at least one positioning aid is at least one recess.

60. A honeycomb body configuration, comprising:
a metal housing;
a honeycomb body disposed in said metal housing, said honeycomb body having a periphery, varying radial strength along said periphery defining regions of greater radial strength, and dividing walls defining and separating a multiplicity of channels from one another; and
a compensation layer disposed at least in partial regions of said periphery between said housing and said honeycomb body;
said honeycomb body having a side facing said compensation layer and at least two radially outwardly directed bulges for forming support sections at said side in said regions of greater radial strength.

61. The honeycomb body configuration according to claim 60, wherein said honeycomb body is a ceramic honeycomb body with smooth dividing walls having a radial strength being greater in direction of said dividing walls than in other directions.

62. The honeycomb body configuration according to claim 60, wherein said honeycomb body is an extruded ceramic honeycomb body with smooth dividing walls having a radial strength being greater in direction of said dividing walls than in other directions.

63. The honeycomb body configuration according to claim 60, wherein said honeycomb body has a length and said bulges extend at least over part of said length.

64. The honeycomb body configuration according to claim 60, wherein said bulges are produced by extruding said honeycomb body using a suitably shaped extrusion tool.

65. The honeycomb body configuration according to claim 60, wherein said support sections are an even number of support sections occurring in pairs and the support sections of each pair are disposed diametrically opposite to each other in a cross-section.

66. The honeycomb body configuration according to claim 60, wherein said honeycomb body has at least one positioning aid for correct relative positioning of said honeycomb body and said housing.

67. The honeycomb body configuration according to claim 66, wherein said at least one positioning aid is optical markings.

68. The honeycomb body configuration according to claim 66 wherein said at least one positioning aid is at least one projection.

69. The honeycomb body configuration according to claim 66, wherein said at least one positioning aid is at least one recess.

70. The honeycomb body configuration according to claim 60, wherein said honeycomb body has an axial length, and said support sections extend at least over part of said axial length.

71. The honeycomb body configuration according to claim 60, wherein said honeycomb body has at least one positioning aid for correct relative positioning of said honeycomb body and said compensation layer.

72. The honeycomb body configuration according to claim 71, wherein said at least one positioning aid is optical markings.

73. The honeycomb body configuration according to claim 71, wherein said at least one positioning aid is at least one projection.

74. The honeycomb body configuration according to claim 71, wherein said at least one positioning aid is at least one recess.

75. The honeycomb body configuration according to claim 60, wherein said compensation layer has at least one positioning aid for correct relative positioning of said honeycomb body and said housing.

76. The honeycomb body configuration according to claim 75, wherein said at least one positioning aid is optical markings.

77. The honeycomb body configuration according to claim 75, wherein said at least one positioning aid is at least one projection.

78. The honeycomb body configuration according to claim 75, wherein said at least one positioning aid is at least one recess.

79. The honeycomb body configuration according to claim 60, wherein said compensation layer has at least one positioning aid for correct relative positioning of said honeycomb body and said compensation layer.

80. The honeycomb body configuration according to claim 79, wherein said at least one positioning aid is optical markings.

81. The honeycomb body configuration according to claim 79, wherein said at least one positioning aid is at least one projection.

82. The honeycomb body configuration according to claim 79, wherein said at least one positioning aid is at least one recess.

83. The honeycomb body configuration according to claim 60, wherein said housing has at least one positioning aid for correct relative positioning of said honeycomb body and said housing.

84. The honeycomb body configuration according to claim 83, wherein said at least one positioning aid is optical markings.

85. The honeycomb body configuration according to claim 83, wherein said at least one positioning aid is at least one projection.

86. The honeycomb body configuration according to claim 83, wherein said at least one positioning aid is at least one recess.

87. The honeycomb body configuration according to claim 60, wherein said housing has at least one positioning aid for correct relative positioning of said honeycomb body and said compensation layer.

88. The honeycomb body configuration according to claim 87, wherein said at least one positioning aid is optical markings.

89. The honeycomb body configuration according to claim 87, wherein said at least one positioning aid is at least one projection.

90. The honeycomb body configuration according to claim 87, wherein said at least one positioning aid is at least one recess.

* * * * *